July 18, 1950  M. WINTERHALTER  2,516,086
APPARATUS AND METHOD FOR THE MANUFACTURE
OF SEPARABLE FASTENERS
Filed Dec. 27, 1945  4 Sheets-Sheet 1
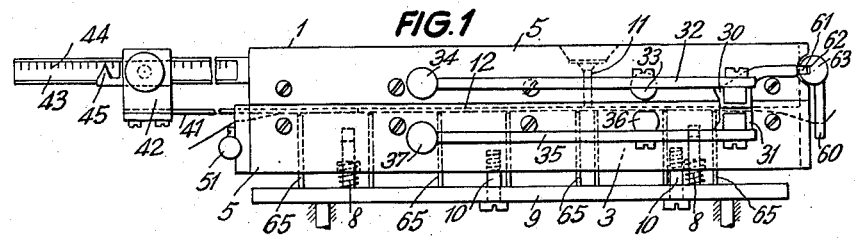
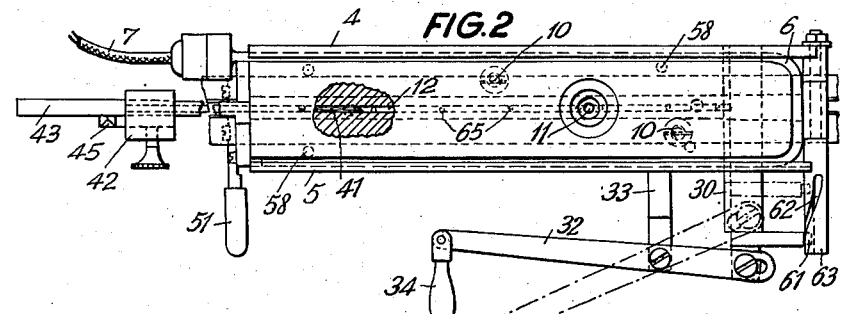
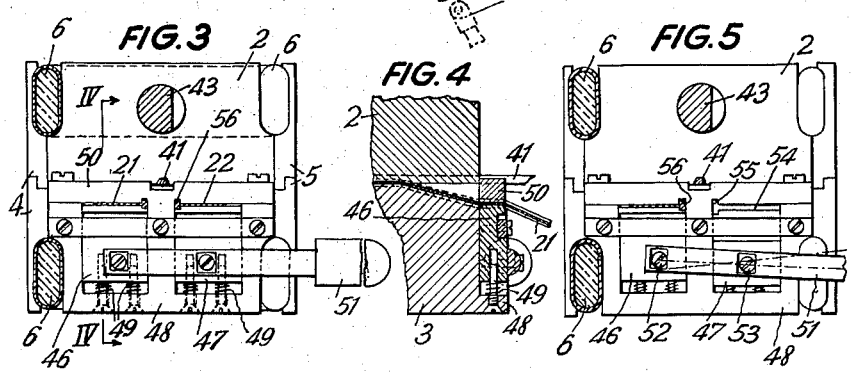
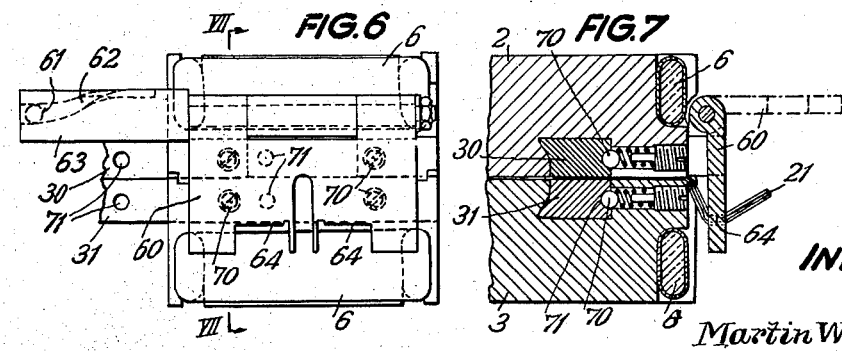
INVENTOR:
Martin Winterhalter
by Emery Booth Townsend Miller Waidner
Attys

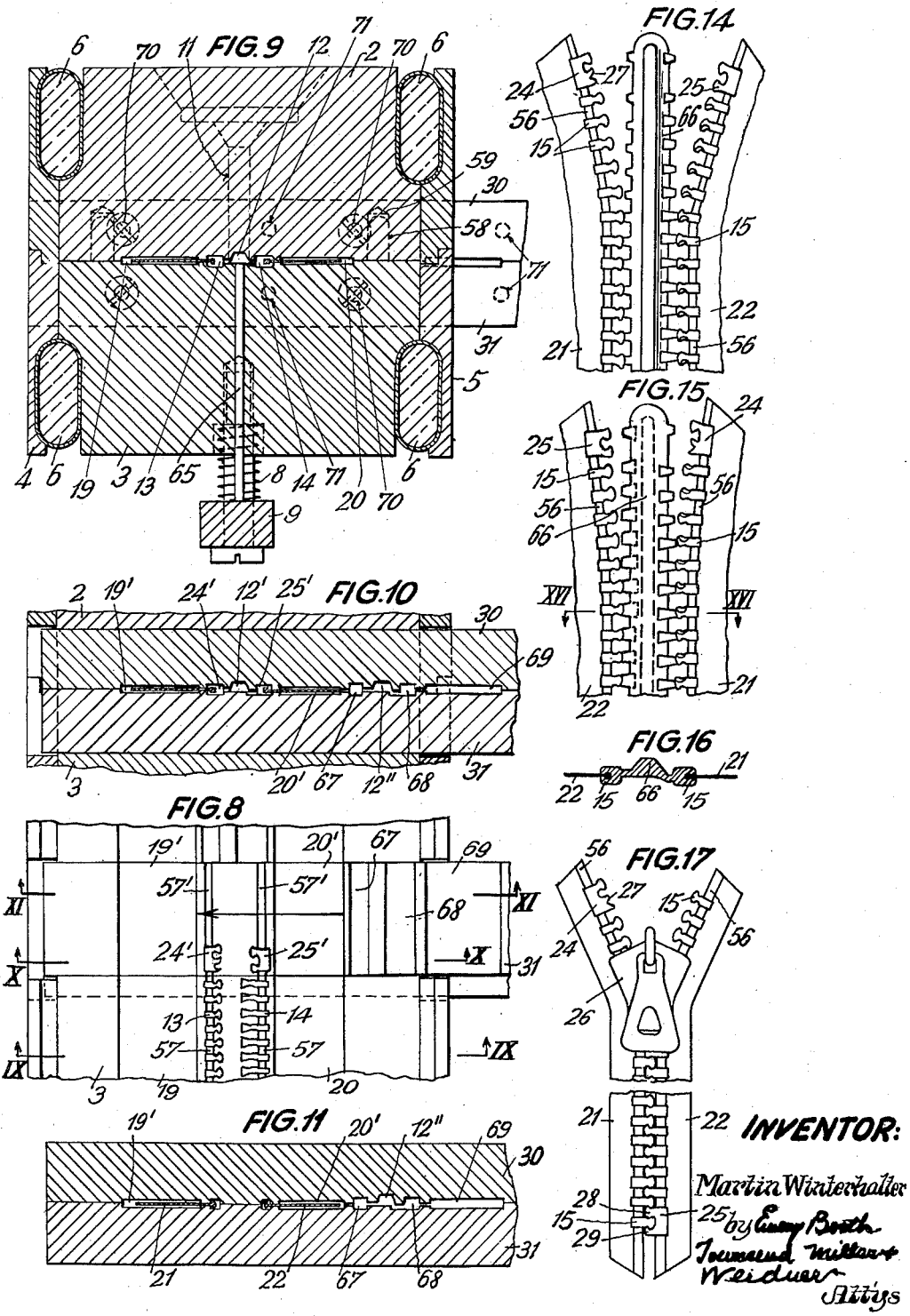

July 18, 1950
M. WINTERHALTER
2,516,086
APPARATUS AND METHOD FOR THE MANUFACTURE
OF SEPARABLE FASTENERS
Filed Dec. 27, 1945
4 Sheets-Sheet 3
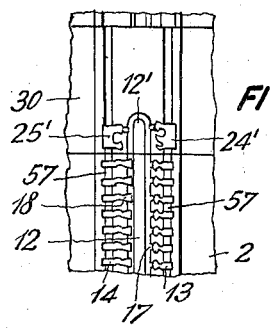
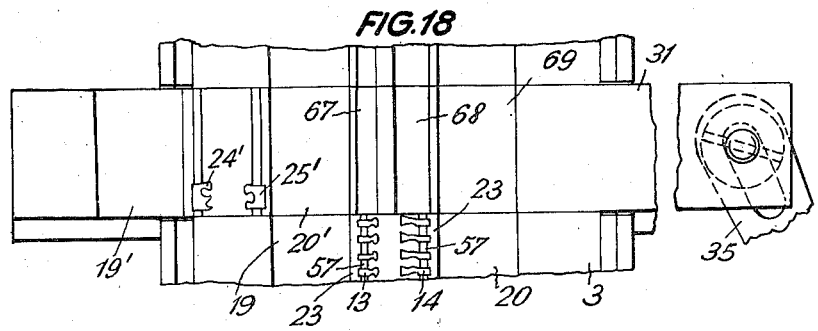
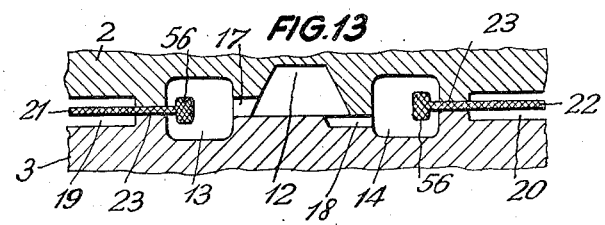
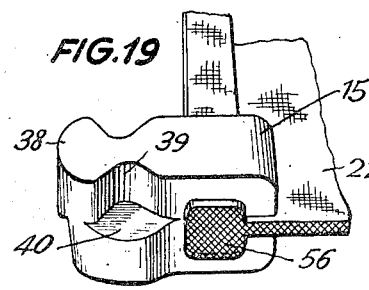
INVENTOR:
Martin Winterhalter
by Emery, Booth, Townsend,
Miller & Weidner
Attys.

July 18, 1950   M. WINTERHALTER   2,516,086
APPARATUS AND METHOD FOR THE MANUFACTURE
OF SEPARABLE FASTENERS
Filed Dec. 27, 1945   4 Sheets-Sheet 4
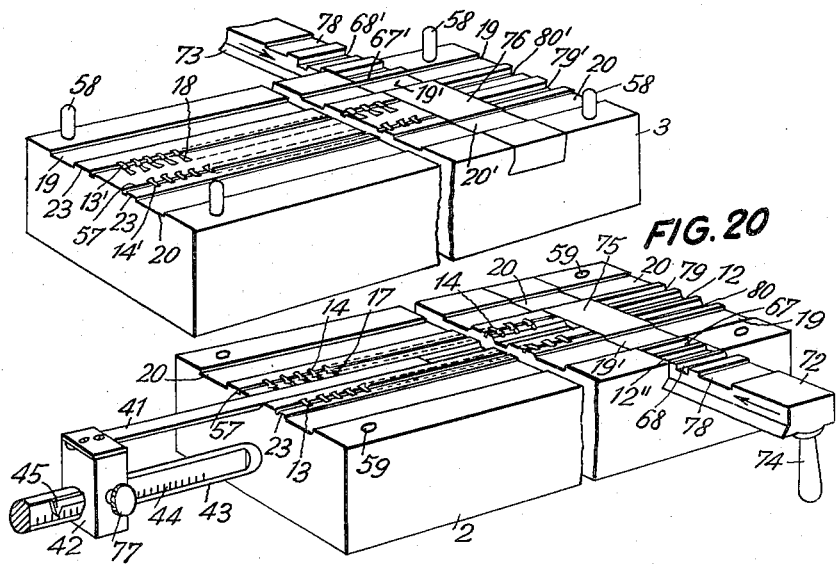
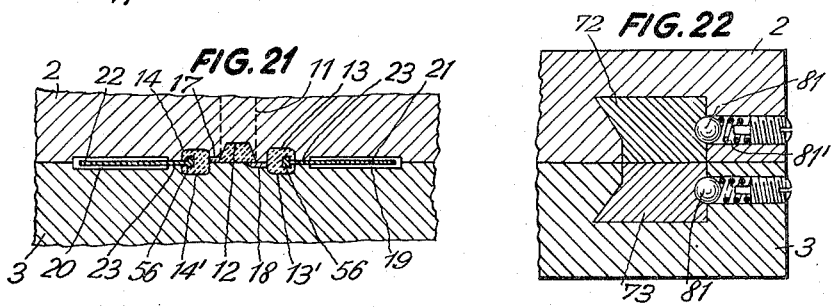
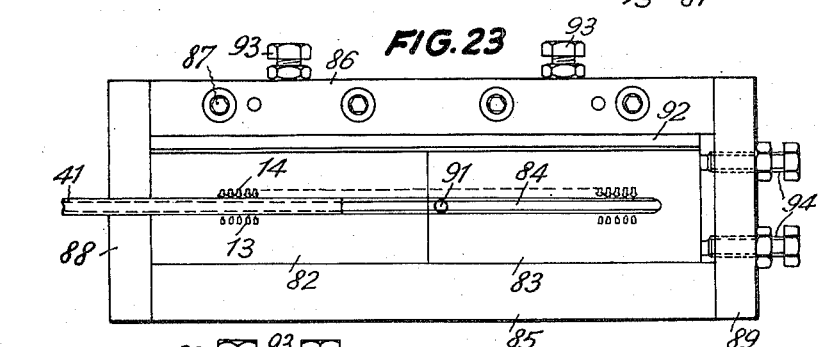
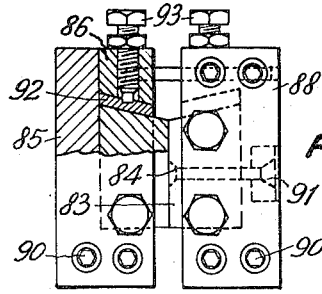
INVENTOR:
Martin Winterhalter
by Emery Booth Townsend Miller & Weidner
Attys.

Patented July 18, 1950

2,516,086

UNITED STATES PATENT OFFICE 2,516,086

APPARATUS AND METHOD FOR THE MANUFACTURE OF SEPARABLE FASTENERS

Martin Winterhalter, Morcote, Switzerland

Application December 27, 1945, Serial No. 637,379
In Switzerland January 19, 1945

18 Claims. (Cl. 18—36)

1

This invention relates to apparatus and a method for the manufacture of separable fasteners, particularly of the type having interlocking elements directly molded on the stringers.

It is an object of the present invention to produce interlocking fastener elements directly on the edge of a stringer by means of a two-part mold-box capable of molding in a single casting operation a series of interlocking elements on the stringer, and to provide means permitting to cast in the same mold parts a longer or shorter series of interlocking elements on a stringer, or to successively cast in two or more casting operations several series of interlocking elements with all the elements in correctly spaced relation, so as to produce by means of a single two-part mold fastener stringers of any desired length.

It is known that the ends of the fastener stringers of separable fasteners are provided with end stop members to limit the stroke of the operating slider and to permanently connect the stringers at one end thereof.

It is a further object of this invention to produce fastener stringers by means of a two-part mold in which a series of interlocking elements and an end stop member are simultaneously molded on a stringer in a single casting operation, and provisions are made to cast in a first operation a series of interlocking elements and an end stop member, and in a successive operation a second series of interlocking elements only, following the first series on the same stringer, whereby stringers of any desired length can be produced, having an end stop member molded thereon at one end of the row of interlocking elements.

Further objects and advantages of the invention will appear from the following detailed description thereof, reference being had to the accompanying drawings, in which two embodiments of the invention are illustrated by way of example.

Fig. 1 is a view in lateral elevation of a mold-box comprising two mold parts for die-casting fastener stringers.

Fig. 2 is a plan view of this mold-box.

Fig. 3 is an end view of the mold-box, viewed from the left hand side of Fig. 1, partially drawn in section and to a larger scale.

Fig. 4 is a fragmentary section along the line IV—IV of Fig. 3.

Fig. 5 is a view similar to that shown in Fig. 3 and representing another position of operation.

Fig. 6 is a view in elevation of the right hand end of the mold-box.

Fig. 7 is a sectional view along the line VII—VII of Fig. 6.

Fig. 8 is a fragmentary plan view of the lower half of the mold-box.

2

Fig. 9 is a sectional view of the mold-box along the line IX—IX of Fig. 8.

Fig. 10 is a sectional view along the line X—X of Fig. 8.

Fig. 11 is a sectional view along the line XI—XI of Fig. 8.

Fig. 12 is a fragmentary plan view of the upper mold half.

Fig. 13 is a fragmentary sectional view along the line IX—IX of Fig. 8, drawn to a larger scale.

Figs. 14 and 15 show views of the top and bottom face of the die-cast work piece after removal from the mold.

Fig. 16 is a sectional view along the line XVI—XVI of Fig. 15.

Fig. 17 shows the finished fastener.

Fig. 18 is a plan view of a portion of the lower mold half, similar to Fig. 8, but in another position of operation.

Fig. 19 shows a fastener element in perspective view.

Fig. 20 is a perspective view of the two parts of a modified mold-box for die-casting the two fastener stringers of a separable fastener in any desired length, but without end stop members.

Fig. 21 is a fragmentary transverse section through the two joined mold parts.

Fig. 22 is a fragmentary longitudinal section through one end of the two joined mold parts.

Fig. 23 is a plan view of one part of a modified mold.

Fig. 24 is an end view, partially shown in section, of the two joined parts of the modified mold-box.

Referring more particularly to Figs. 1 to 11, the represented apparatus comprises a two-part mold-box 1 containing an upper mold part 2 and a lower mold part 3 (Figs. 7 and 9) formed of steel and arranged to be applied towards each other and to be removed from each other by any known means not represented. The two mold parts 2 and 3 are surrounded by outer protective walls 4 and 5, and an electric resistance heating device 6 is provided between the protective walls and both mold parts 2 and 3; a cable 7 feeds current to the heating coil of the device 6. When die-casting the fastener elements the two mold parts are electrically heated in order to prevent a too fast solidification of the liquid or plastic casting material by the metal parts of the molds.

The lower mold part is carried on a supporting bar 9 by the intermediary of springs 8 (Figs. 1 and 9). The springs 8 urge the lower mold part 3 against the upper mold part 2, while guide screws 10 screwed into the mold part 3 and penetrating through the supporting bar guide the movement of the lower mold part when the two mold parts are separated. The upper mold part 2 is provided with the casting gutter 11 for the casting material, connected to a not represented pressure vessel, for instance containing a liquid metal such as zinc or a synthetic thermoplastic material, such as high molecular condensation products, as for example polyamide, or the like.

In the represented mold the interlocking elements of the two fastener stringers of a separable fastener are simultaneously cast. The inlet 11 leads into a casting channel 12 (Figs. 9 and 13) extending longitudinally in the center over the entire length of the upper mold part 2 and for which the other mold part 3 forms a tight cover when the two parts are applied towards each other. On either side of the channel 12 the surfaces of both mold parts 2 and 3 are provided with rows of successive recesses 13 and 14 which, when the two mold parts are joined, form together the individual molds for the single interlocking fastener elements 15 of the two stringers. These various individual molds of each row are equally spaced at the same relative distance as the interlocking fastener elements on the finished stringers. The casting channel 12 is connected with each of the recesses 13 and 14 of either row of recesses, the recesses 13 of one row being each connected to the channel 12 by a small groove 17 in the upper mold part 2, and the recesses 14 of the other row being each connected to the channel 12 by small grooves 18 formed in the lower mold part 3. Laterally of the two rows of recesses 13 and 14, the two mold parts are provided with shallow recesses 19 and 20 also extending longitudinally over the entire length of the mold surfaces. These recesses are destined to receive the two stringer tapes 21 and 22 which project into the recesses 13 and 14 by their beaded edge 56. Between the recesses 13 and 14 and the adjacent tape recesses 19 and 20 the opposite mold surfaces 23 are disposed at such a slight distance from each other as to compress the tapes 21 and 22 between themselves and form a tight closure at the points where the tapes enter into the mold recesses.

With reference to Fig. 17 it is seen that the separable fastener produced in the described apparatus is provided at one end of each of the two stringers with a special end stop member 24 and 25, the member 24 limiting the stroke of the slider at that end of the fastener remaining open, while the member 25 is used to permanently unite the two stringers at their lower end.

A separable fastener of this type is described and claimed in my copending application Ser. No. 514,219 now abandoned. When the slider 26 is drawn upwardly in Fig. 17, the last fastener element 15 of the stringer 22 is abutting against the portion 27 of the end stoop member 24, whereby the two stringers are prevented from completely approaching each other and accordingly cannot pass through the guide channel of the slider so that this latter is stopped. The lower end member 25 on the stringer 22 is provided with two coupling heads 28 and 29 between which the last fastener element 15 of the stringer 21 is inserted after the slider has been strung on the two stringers. The two coupling heads 28 and 29 of the member 25 are then clamped towards the coupling head of the element 15 engaged between them to permanently lock this head and unite the two stringers. The end member 25 has such dimensions that it can slide through the guide channel of the slider before being coupled to the last fastener element 15.

According to the present invention the two end members 24 and 25 are die-cast on the two stringers in the same casting operation together with the fastener elements 15. This is made possible particularly by the provision of the end member 25 permitting the slider to be strung on the stringers and then the two stringers to be permanently united.

Die-casting of the end members 24 and 25 simultaneously with the fastener elements 15 at the two stringers could simply be effected by the provision of correspondingly shaped mold recesses at the ends of the rows of recesses 13 and 14. But in this case one pair of mold parts 2 and 3 could be used only for casting stringers of the same length.

The device according to the present invention can be used to cast fastener stringers of any desired length provided with end members. For this purpose the mold recesses 24' and 25' for casting the two end members are provided on sliders 30 and 31 carried by the two mold halves 2 and 3 (Figs. 8, 10, 11 and 12), the slider 30 being transversely movable on the mold part 2 and the slider 31 being transversely movable on the mold part 3. As shown in Figs. 1 and 2, the slider 30 is connected to an operating lever 32 pivotally mounted on a bracket 33 fixed to the upper mold part 2 and provided with a handle 34. The slider 31 is connected to an operating lever 35 pivotally mounted on a bracket 36 fixed to the lower mold part 3 and carrying a handle 37. By means of the two handles 34 and 37 the two sliders 30 and 31, which are slidably engaged in transverse slots of the two mold parts can be brought into one or the other of two positions as will be seen from Figs. 2, 8 and 18. In one of these two positions the mold recesses 24' and 25' for the end members are situated in alinement with the mold recesses 13 and 14 at the end of the two rows of recesses as shown in Fig. 8, while in the other position the two recesses 24' and 25' for the end members are displaced laterally as shown in Fig. 18. The sliders are yieldingly maintained in the two positions by spring urged balls 70 (Fig. 7) engaging corresponding recesses 71 provided at one side of the sliders.

Since a two-part mold is used for casting the stringers, the fastener elements cannot be formed with the usual coupling socket which is closed all around, as in punched fastener elements, but the cast fastener elements are provided with coupling recesses or grooves which are open towards one longitudinal face of the elements similar to the fastener elements shown in my earlier U. S. Patent No. 2,239,803.

As shown in Fig. 19, the fastener elements 15 are formed with a coupling head 38 and with a coupling groove 39 extending both through about half the width of the element. The groove 39 is closed by a bottom surface 40 which cooperates with the coupling head of the next following element of the opposed stringer engaging with the groove 39, the coacting coupling heads 38 and surfaces 40 preventing the interlocked elements of the two stringers to relatively move in directions at right angles to the plane of the stringers. The joining surfaces of the two mold parts are situated with such types of fastener elements on the level of the surface 40 and of the lower end face of the coupling head 38. Since in the finished fastener according to Fig. 17 the two end members 24 and 25 are situated at opposite ends of the stringers, while in the casting mold the corresponding recesses 24' and 25' are provided on the same transverse sliders at one end of the two rows of recesses 13 and 14 for the fastener elements, these two rows of fastener elements must be cast in reversed position relatively to each other. With the row of recesses 13 the space forming the coupling head 38 of the fastener elements is engraved in the lower mold part 3, and with the row of recesses 14, the space for the coupling head is engraved in the upper mold part 2, while the recesses of the other mold part are shaped to form the lower part of the fastener elements in Fig. 19, provided with the surface 40.

In order to be able to cast shorter fastener stringers with the represented mold parts than that corresponding to the total length of the rows of recesses 13 and 14, provision is made of a slider 41 arranged to penetrate longitudinally from one end of the mold-box more or less into the casting channel 12. This slider 41 is carried by a block 42 capable of sliding along a rod 43 carried by the upper mold part 2 and provided with a scale graduation 44 coacting with a pointer 45 moving with the block 42. The cross sectional shape of the longitudinal slider 41 exactly corresponds to that of the casting channel 12, so that the free end of the slider acts as a tight closure of the casting channel and according to the length of the slider engaged into the channel 12, a longer or shorter portion thereof between the left end face of the mold-box in Figs. 1 and 2 and the casting gutter 11, can be closed to the entrance of casting material, and a portion only of the length of the rows of recesses 13 and 14 will be filled with material. By means of the pointer 45 the length of the open channel section or the rows of recesses free to communicate therewith can be directly read on the graduation 44.

For producing fastener stringers in the described mold the two mold parts are removed from each other and the two stringer tapes 21, 22, which preferably are unwound from not represented supply rolls, are introduced from the left end in Figs. 1 and 2 between the two mold parts 2 and 3 and inserted into the recesses 19 and 20 of the lower mold part, 3. By means of the clamping device represented in Figs. 3 to 5 the two tapes can be clamped at the left end of the mold-box. This device comprises two clamping members 46 and 47 which are movable up and down in a guide frame 48 fixed to the lower mold part 3, and are pressed upwardly by springs 49 in order to clamp the two tapes 21 and 22 between themselves and the upper transverse member 50 of the frame.

The two clamping pieces 46 and 47 can be moved by means of an operating lever 51 engaged with a certain play on screws 52 and 53, carried by the two clamping pieces. When introducing the two tapes 21 and 22 into the mold the lever 51, as shown in Fig. 5, is pushed downwardly by using the screw 52 as fulcrum, so that the clamping piece 47 is moved downwardly by compressing its springs 49, and the tape 22 can be pulled across the slit opening 54 between the transverse member 50 and the clamping member 47. Afterwards the lever 51 is released, so that the clamping piece 47 is urged upwardly by the springs and clamps the tape in the opening 54. Now the lever 51 is pressed upwardly by using the screw 53 as fulcrum, so that the clamping piece 46 moves downwardly and the tape 21 can be pulled through the open slit between the clamping piece 46 and the transverse member 50, whereafter the lever 51 is again released and the clamping piece 46 slides upwardly under the action of the springs 49 to clamp the tape 21. The slit openings 54 between the clamping pieces 46, 47 and the transverse member 50 are formed with recesses 55 for the passage of the usual edge bead 56 of the carrier tapes. These latter are now inserted in the depressions 19 and 20 of the lower mold part 3, while the edge head 56 penetrates into the mold recesses 13 and 14 and between the successive recesses small longitudinal grooves 57 are provided to receive the bead (Fig. 18). The same grooves are naturally also provided between successive recesses 13 and 14 in the upper mold half 2 (Fig. 12). Corresponding grooves 57' and depressions 19' and 20' for the tapes are also provided in the two transverse sliders 30 and 31.

The upper mold part 2 is now lowered on the lower mold part, and pins 58 carried by the lower part penetrate into corresponding holes 59 of the upper part (Fig. 9) in order to ensure exact alinement of the corresponding recesses 13 and 14 in the two cooperating mold parts. When joining the two mold parts the two levers 32 and 35 are in the position drawn in full lines in Fig. 2, in which the sliders 30 and 31 are in the positions shown in Figs. 8 and 10, where the recesses 24' and 25' for the end members are disposed at the end of, and in alinement with the rows of recesses 13 and 14. The slider 30 of the upper mold part is connected with a tape tensioning member 60 hingedly mounted on the upper mold part, a pin 61 of the slider 30 penetrating into a helical slot 62 provided in an extension 63 of the axis of the tensioning member 60. When the lever 32 and the slider 30 are in the position represented in full lines in Figs. 2 and 8, the member 60 is downwardly directed as shown in full lines in Fig. 7, and when the lever 32 has been turned to the position shown in dash and dot lines in Fig. 2 and the slider 30 has been displaced thereby, the pin 61 moving along the helical groove 62, the tensioning member 60 is turned upwardly in the position represented in dash and dot lines in Fig. 7. When the two mold parts are joined with the tensioning plate 60 in the downwardly directed position, the recessed edge portions 64 of the plate 60 abut against the two tapes 21 and 22 and pull them downwardly (Fig. 7), so that the tapes inserted into the recesses 19 and 20 of the lower mold part are tensioned before the two mold parts are pressed against each other. The two mold parts 2 and 3 are then firmly held together by clamping jaws in known manner. Now the casting material is supplied in liquid or plastic condition from a tank and fed under high pressure through the gutter 11 into the longitudinal channel 12, from which the material flows through every single groove 17 and 18 into the rows of mold recesses 13 and 14. An extension 12' of the casting channel is provided in the transverse slider 30 (Figs. 10 and 12) permitting the casting material to flow to the recesses 24' and 25' of the end members.

After the mold has been filled and the material has solidified the two mold parts are separated. The lower mold part 3 is slightly moved downwardly relatively to the supporting bar 9, whereby expulsing pins 65 carried by this bar penetrate through openings of the lower mold part and act against the bar-shaped mass of casting material 66 which solidified in the interior of the casting channel 12 to lift this mass off the surface of the lower mold part and to expulse the cast fastener elements 15 from the mold recesses 13 and 14 of the lower part, while the cast elements have already left the recesses 13 and 14 of the upper mold part owing to their weight, when this latter had been lifted off the lower part.

The two tapes 21 and 22 are now still united with the central bar-shaped mass 66 by means of the cast fastener elements which are connected with this mass by the material solidified in the small connecting grooves 17 and 18, as represented in Figs. 14 to 16. After releasing the tape clamping members 46 and 47 by means of the lever 51, the cast structure formed by the two tapes 21 and 22 with the cast fastener elements and the central cast bar 66 is pulled out from between the separated mold parts through the right end thereof, and since the tapes are unwound from supply rolls at the left end of the mold-box, fresh lengths of tapes are simultaneously inserted into the recesses 19 and 20 of the lower mold part. The portion of the tapes provided with the fastener elements can now be cut off, if the cast stringers have the desired length. The tapes with the cast elements are then separated from the central cast bar 66, which separation can be easily effected by hand owing to the feeble section of the connecting portions cast in the grooves 17 and 18. Casting burrs which may be adherent to the heads of the cast fastener elements can be removed by passing a grinding wheel over the heads. The two stringers 21 and 22 are then ready to receive the slider 26, and when the slider is engaged on them the last fastener element 15 on the stringer 21 is engaged between the two coupling heads 28 and 29 of the end member 25 on the stringer 22 and these two coupling heads are pressed against the head of the element 15 whereby a permanent connection is obtained between the two stringers at the lower end of the fastener (Fig. 17). The separable fastener produced as described is now ready for use.

When a fastener has to be produced which must be longer than the rows of mold recesses 13 and 14 of the mold, then after the first casting operation the length of tape with the cast fastener elements thereon is not cut off, but after this length of tape with the cast elements thereon has been withdrawn from between the mold parts and fresh lengths of tapes have been placed on the lower mold part the following operations are effected: The two transverse sliders 30 and 31 are displaced by pivoting the levers 32 and 35 whereby the mold recesses 24' and 25' for the end members arrive in the position represented in Fig. 18. The portion of the sliders 30 and 31 which now is in the prolongation of the rows of mold recesses 13 and 14 is provided with two grooves 67 and 68 the width of which corresponds to the length of the cast fastener elements 15. The upper slider 30 is further provided with a channel 12" which in the displaced position of the slider arrives in alinement with the inlet channel 12 of the upper mold part 2. Outside of the groove 68 both sliders are provided with a recess 69 receiving one of the tapes in the position of the sliders represented in Fig. 18, while the other tape is then inserted in the recess 20' of the sliders. The last pair of fastener elements 15, or the two last pairs at the end of the cast stringers opposite the end members 24 and 25 are now inserted into the first pairs of recesses 13 and 14 of the lower mold part 3, while the tapes 21 and 22 with the cast fastener elements and the solidified bar of material 66 traverse the two sliders 30 and 31 and emerge from between the two mold parts, and the already cast fastener elements pass through the grooves 67 and 68. The fresh lengths of tapes inserted in the recesses 19 and 20 of the lower mold part 3 are then tensioned, the clamping pieces 46 and 47 are applied against the tapes and the two mold parts are joined. While the sliders 30 and 31 had been transversely displaced by pivoting the lever 32, the pin 61 penetrating into the slot 62 of the plate 60, this latter had been turned upwardly into the position shown in dash and dot lines in Fig. 7. When now the upper mold part is lowered on the lower part, the tensioning plate 60 does not act against the tapes emerging from the molds which are still connected by the cast fastener elements to the central bar 66 and accordingly from a solid structure and could not be bent as it was the case before the first casting operation. When the two mold parts are joined the channel 12" of the slider 30 of the upper mold half engages over the central bar 66 of the previously cast stringers and the grooves 67 and 68 of the slider engage over the cast fastener elements 15. The longitudinal slider 41 can now be adjusted to the required additional length of stringers to be cast, and liquid or plastic casting material is again injected through the gutter 11 into the channel 12. The end of the central bar 66 of the formerly cast stringers, inserted in the channel 12 at the end thereof, adjacent to the slider 30, now forms a tight closure of the channel at that end, while the longitudinal slider 41 closes the channel at the other end. The first fastener elements 15 of the cast second portion of the stringers are correctly spaced from the last fastener elements of the previously cast stringer section, since these last fastener elements had been inserted into the first mold recesses 13 and 14 of the mold. The two stringers with the rows of fastener elements cast thereon in two successive casting operations can now be separated from the central bar of cast material 66 and united by means of a slider to form a fastener the length of which is equal to the double length of the mold. Obviously, the casting operation for casting a row of fastener elements on the tapes can be repeated several times according to the desired length of fastener, and each time the last fastener elements of the previously cast rows are introduced into the first recesses 13 and 14 of the mold adjacent the transverse sliders 30 and 31.

It results from the above description that the disclosed apparatus enables casting of fastener stringers of any desired length by means of a single form, which stringers can be shorter or longer than the mold. Further, end stop members can be cast on the stringers in the same operation together with the ordinary fastener elements. The described method results in a considerably cheaper manufacturing of separable fasteners and saves much time as compared with the hitherto used methods of casting stringers, since the same mold always remains in the die-casting machine, while until now when casting stringers of various length, the mold had to be changed for each length of stringer.

In the modification represented in Figs. 20 to 22, the two cooperating mold parts 2 and 3 are also destined to be inserted into a die-casting machine and are used to simultaneously cast the two fastener stringers of a separable fastener.

For this purpose each mold part is again provided with two rows of recesses 13, 14 and 13', 14', respectively which recesses, when the two parts are joined, form the single molds for casting the fastener elements directly on the fabric tapes of the fastener. The upper mold part 2 is provided with the inlet 11 (Fig. 21) for the liquid or plastic fastener element material arriving from a pressure tank not represented and discharging into the inlet channel 12 running longitudinally of the entire length of the surface of the upper mold part and between the two rows of molding recesses 13 and 14. Small grooves 17 in the surface of the upper mold part 2 connect the inlet channel 12 to each recess 14 in this mold part, and small grooves 18 in the surface of the lower mold part establish connection between the inlet channel 12 and each of the recesses 13' in this mold part. Laterally of the two rows of recesses 13, 13' and 14, 14' the surfaces of both mold parts are provided with shallow-recesses 19 and 20 destined to receive the tapes 21 and 22 on the edges of which the fastener elements are to be cast. Between these recesses and the mold recesses the opposite surfaces 23 are disposed at such a small distance from each other that they slightly compress the tapes lying between them so as to form a tight closure of the mold recesses at the point where the tapes enter into the recesses. Small longitudinal grooves 57 between successive recesses of the rows of recesses 13, 13' and 14, 14' serve to receive the usual edge bead 56 of the tapes 21 and 22.

The two mold parts 2 and 3 carry each near one of their ends a transversely movable slider 72 and 73, respectively, which can be displaced by means of a finger piece 74. The two rows of mold recesses 13, 13' and 14, 14' extend from the opposite end of each of the mold parts until the respective transverse slider. In the represented position of the slider 72, a portion 75 of the slider acting as stop member intercepts the inlet channel 12; this portion 75 of the slider 72 coacts with a portion 76 of the slider 73 when the two mold parts are joined, to form a tight closure of the casting channel. The two sliders further comprise shallow recesses 19' and 20' which correspond to and are in line with the recesses 19 and 20 of the mold parts, so that the recesses adapted to receive the fastener tapes extend continuously through the whole length of the mold parts.

The upper mold part 2 comprises a longitudinally movable slider 41 which is partly inserted in the channel 12. The cross sectional shape of the slider exactly corresponds to that of the casting channel 12, so that when the two mold parts are joined, the inner end face of the slider 41 together with the base surface of the mold part 3 also forms a tight closure of the casting channel 12 on the side of the inlet 11 opposite that of the transverse slider 72. The longitudinal slider 41 is secured by its outer end on a block 42 slidably engaged on a rod 43 fixed to the mold part 2. This rod 43 is provided with a scale graduation 44 with which cooperates an index 45 carried by the block 42. A set screw 77 permits to firmly clamp the block 42 to the rod 43. According to the length of the slider 41 which is engaged in the casting channel 12, a greater or smaller number of mold recesses 13, 13' and 14, 14' can be shut off from connection with the channel. When the slider is pulled out of the channel 12 until near the end face of the mold, rows of fastener elements can be cast having a length corresponding to the total length of the rows of mold recesses between the end face of the mold parts and the transverse sliders 72 and 73, while upon moving the longitudinal slider 41 inwardly in the channel 12 a certain number of mold recesses are disconnected from the open portion of the channel 12 and it is possible to cast fastener stringers of shorter length than the total length of the rows of mold recesses 13, 13', 14, 14'.

Die-casting of fastener stringers by means of the mold represented in Fig. 20 is effected in simple manner by placing two fastener tapes in the depressions 19 and 20 of the lower mold part 3, when the two mold parts are held at a certain distance one above the other, and then the two mold parts are applied towards each other, the centering pins 58 of the lower part entering into the corresponding holes 59 of the upper part, and the two parts are pressed together in known manner, either mechanically or hydraulically. The longitudinal slider 41 is then adjusted according to the desired length of the stringers to be produced, by means of the index 45 and the graduation 44 on the rod 43. Liquid metal or hot plastic material is then injected through the gutter 11 into the channel 12, in which it flows in one direction until the transverse slider 72 and in the opposite direction until the end face of the slider 41, and from which it enters through the grooves 17 and 18 into the single mold recesses of the fastener elements. After solidification of the cast material the two mold parts are separated from each other and the two stringer tapes with the fastener elements cast thereon can be removed from the mold part 2, together with the bar of material solidified in the casting channel 12. The fastener elements cast upon the tapes are then easily separated from the cast bar of material between the two tapes by breaking the small connecting studs between this central bar and the fastener elements, formed by the material solidified in the grooves 17 and 18 of the mold. If necessary, the fastener elements on the tapes can be treated to remove seams and burrs. The two stringers are now ready to be united by means of the usual slider to form a complete separable fastener.

Owing to the provision of the transverse sliders 72 and 73 it is not only possible to cast stringers having the same length as the length of the rows of recesses 13, 13' and 14, 14' of the mold, or of a shorter length depending on the position of the longitudinal slider 41 within the channel 12, but it is also possible to cast sliders of a greater length than that of the mold, as will be described hereafter.

The transverse sliders 72 and 73 are provided, besides the recesses 19' and 20' for the stringer tapes, with a further recess 78 of the same width as the recesses 19 and 20, and the distance between the recesses 19' and 78 is equal to the distance between the recesses 19' and 20'. The slider 72 is further provided with a channel 12'' between the recesses 19' and 78, which channel has the same cross sectional shape as the channel 12 of the mold part 2, and on either side of the channel 12'', the slider is provided with grooves 67 and 68. The groove 67 has a cross sectional profile similar to that of a recess 14 and joining inlet groove 17, while the groove 68 has the same cross sectional profile as that of a recess 13. Between the slider 72 and the adjacent end of the mold part 2, the surface of the mold part between the recesses 19 and 20 is formd similarly to the slider 72 between the recesses 19' and 78. On either side of the channel 12 the mold surface comprises grooves 79 and 80, respectively, having the same cross sectional shape as the grooves 67 and 68, and which are disposed in alinement with the rows of recesses 13 and 14.

The slider 73 is provided between the recesses

19' and 78 with a groove 67' having a cross sectional profile similar to that of a mold recess 14, and with a groove 68' having a cross sectional profile similar to that of a mold recess 13' and joining groove 18. Between the slider 73 and the adjacent end of the mold part 3 the surface of this mold part comprises two grooves 79' and 80' having the same cross sectional profile as the grooves 67' and 68', respectively, of the slider 73.

The sliders 72 and 73 can be displaced from the represented positions, so that the recesses 19' and 78 of the sliders arrive in alinement with the recesses 20 and 19, respectively of the corresponding mold parts. In this position of the slider 72 the channel 12" of the slider is in alinement with the channel 12 of the mold surface, and the grooves 67 and 68 are in alinement with the grooves 79 and 80 and with the rows of recesses 14 and 13, while upon displacement of the slider 73 the two grooves 67' and 68' of the slider are in alinement with the grooves 79' and 80' of the mold surface, and with the rows of recesses 14' and 13', respectively.

As represented in Fig. 22, the two sliders 72 and 73 are yieldingly maintained in either of their two operating positions by balls 81 subjected to the pressure of springs 81'.

For producing a separable fastener of greater length than the length of rows of mold recesses in the two mold parts, one proceeds in the following manner. First stringer tapes 21 and 22 of the required length are placed into the recesses 19 and 20 of the lower mold half and into the recesses 19' and 20' of the transverse slider 72, the two transverse sliders 72 and 73 being in the position represented in Fig. 20, and the two mold parts are then applied against each other. A portion of the tapes, which are longer than the mold, emerges from the closed mold at the end thereof carrying the longitudinal slider. The tapes could also be unwound from supply rolls disposed on the die-cast machine behind the mold. The liquid or plastic casting material is now injected into the casting channel 12 and a row of fastener elements is cast on the two stringers corresponding to the length of the rows of recesses 13, 13' and 14, 14' between the end face of the longitudinal slider 41 and the two transverse sliders 72 and 73. After solidification of the cast material the two mold parts are slightly separated and the cast fastener elements together with the bar of material solidified in the casting channel 12 are removed from the recesses and channel, respectively, for example by not represented means similar to the pins 65 disclosed in Fig. 9. Now the transverse sliders 72 and 73 are displaced in the direction of the arrows in Fig. 20, until the recesses 19' and 78 arrive in alinement with the depressions 20 and 19, respectively of the corresponding mold parts, while the grooves 12", 67 and 68 of the slider 72 are then in alinement with the channels 12, 79 and 80 of the mold part 2, and the grooves 67' and 68' of the slider 73 in alinement with the grooves 79' and 80' of the mold part 3.

The two tapes 21 and 22 which are united by the fastener elements cast thereon and by the material solidified in the channel 12 and the connecting grooves 17 and 18, are now drawn out from between the two mold parts at the end thereof adjacent the transverse sliders 72 and 73, until the two last cast fastener elements of each stringer arrive at the first pair of mold recesses 13, 14 and 13', 14' adjacent the transverse sliders, whereby fresh lengths of tapes 21 and 22 are drawn into the recesses 19 and 20 of the mold parts. When now the two mold parts are again applied towards each other, said two last fastener elements of the cast rows of elements are inserted in the first pair of mold recesses 13, 14 and 13', 14' near the transverse sliders, while the central bar of solidified material between the two cast stringers is lodged in the alined grooves 12" and 12 at the end of the mold part 2, and a portion of the cast fastener elements is inserted in the grooves 67, 68 of the slider 72 and the alined grooves 79 and 80 of the lower mold part, as well as in the corresponding grooves 67' and 68' of the slider 73 and the alined grooves 79' and 80' of the upper mold part. The end face of the central bar of solidified material enclosed in the end portion of the channel 12 adjacent the slider 72 forms a tight closure of the channel 12 adjacent to slider 72. The longitudinal slider 41 is now adjusted according to the length of additional rows of fastener elements to be cast on the tapes following the already cast lengths of stringers, and then casting material is again pressed into the channel 12. After solidification of the cast material the stringers having been obtained in two successive casting operations can now be removed from the mold parts and the tapes with the cast fastener elements broken away from the central bar of solidified material. The cast fastener elements can then be treated to remove burrs. The first pair of fastener elements of the portion of the stringers cast in the second operation is without else correctly spaced from the last pair of elements of the portion of the stringers cast with the first operation, since this last pair of elements had been inserted in mold recesses 13, 13' and 14, 14' of the two mold parts. The two stringers cast in two successive operations can now be united by a usual slider to form a separable fastener, the length of which is equal to the sum of the lengths of rows of mold recesses which had been in communication with the inlet channel 12, according to the position of the longitudinal slider 41, during the two casting operations.

The successive casting of further rows of fastener elements on the tapes can be repeated any desired time, by always inserting the last pair of cast fastener elements of the previously cast portion of the stringers into the first pair of mold recesses 13, 13' and 14, 14' adjacent the transverse sliders 72 and 73. In this manner any desired length of fastener stringers can be produced without ever exchanging the mold parts inserted into the die-casting machine.

The example according to Figs. 23 and 24 represents a mold in which both mold parts are made in two sections.

When long molds are required, it is advantageous to form the mold parts in two or more sections, since it is difficult to produce the joining mold surfaces of long molds with the necessary precision so as to be completely tight against the high die-casting pressures which are required. Each mold part in the represented example is formed of two sections 82 and 83. The two sections of one of the mold parts are provided with the casting channel 84, and on either side of this channel there is provided a row of recesses 13 and 14, respectively, which form the mold recesses for the fastener elements when the two mold parts are joined. The mold recesses 13 and 14 are formed in the two sections 82 and 83 in such manner that the correct distance between successive recesses is maintained at the line of separation of the two sections. The depressions for the insertion of the stringer tapes are not represented. The two mold parts formed each in two sections are disposed in a frame comprising a bottom piece 85, a side wall 86 fixed to the bottom piece by screws 87 and two end walls 88 and 89, fixed to the bottom piece 85 and to the side wall 86 by screws 90. The bottom piece 85 of one of the two mold parts is provided with the casting gutter 91 communicating with the channel 84 of this mold part. The two bottom pieces 85 can be formed as heating plates to heat the mold before the casting operation, and for this purpose they can contain an electric heating coil. One of the lateral faces of the two mold sections 82 and 83 of each mold part is bevelled, and the bevelled face coacts with a pressure plate 92 against which act screws 93 applying the mold sections towards the opposite wall of the bottom piece 85 and owing to the bevelled faces also against the bottom face of the piece 85. Screws 94 carried by the end wall 89 of the frame act against the two mold parts and apply the mold sections against the opposite end wall 88 of the frame.

A longitudinal slider 41 is movable along the casting channel 84. This slider is formed in the same manner as that represented in Fig. 20 and is adapted to penetrate more or less into the casting channel 84 so as to interrupt the connection of a certain length of the rows of recesses 13 and 14 with the casting channel and accordingly cast stringers of a shorter length than the total length of the rows of recesses. For casting fastener stringers the two mold parts are inserted into a die-casting machine and then the casting operation is performed in the same manner as described with reference to Fig. 20.

The mold parts made in several sections as represented in Fig. 23 could obviously also be provided with transverse sliders as shown in Fig. 20 so that sliders of any greater length than that of the mold parts could be cast in successive operations. When the mold parts formed of several sections are of a certain length, the channel 84 could be connected to two or more spaced inlets 91 so as to reduce the length of the path of the casting material pressed into the mold and prevent a too rapid cooling of the material which could prevent the flow of the liquid material through the small connecting grooves into the mold recesses 13 and 14. When the mold part is formed in several sections, the advantage is obtained that upon an imperfection or wear of a portion of the mold it is not necessary to change the entire mold half but only the faulty section.

I claim:

1. Apparatus for the manufacture of separable fasteners having interlocking elements molded directly on the stringers, comprising a two-part mold-box, said mold-box having therein a recess for the reception of a stringer, a casting channel for the molding material, and row of molds corresponding to the dimensions of the interlocking elements to be produced, each mold being in communication with the casting channel, the mold-box being formed with an inlet opening communicating with the casting channel for entering casting material thereinto, a closure member in said casting channel having an end portion which exteriorly is of the same cross-sectional shape and dimensions as said channel, which closure member is adapted to be adjusted longitudinally of the channel toward and away from the point of communication of said inlet opening with said channel to vary the free length of the channel and the number of molds adapted to receive molding material.

2. Apparatus for the manufacture of separable fasteners having interlocking elements molded directly on the stringers, comprising a two-part mold-box, each mold part having therein a recess for the reception of a stringer and a row of mold recesses, the two rows of mold recesses coacting with each other when the mold parts are joined to form molds corresponding to the dimensions of the interlocking elements to be produced, one of the mold parts having formed in its mold parting face a casting channel for the molding material laterally closed by the parting face of the other mold part and extending longitudinally of the row of mold recesses and connected to each of said molds, and a closure member for said casting channel of the same cross-sectional shape and dimensions as said channel fitting the walls of said channel and the parting face of said other mold part, said member being longitudinally adjustable within said casting channel to vary the free length of the channel and the number of molds adapted to receive molding material.

3. Apparatus for the manufacture of separable fasteners having interlocking elements molded directly on the stringers, comprising a two-part mold-box, each mold part having therein a recess for the reception of a stringer, a row of mold recesses, the two rows of mold recesses coacting with each other when the mold parts are joined to form molds corresponding to the dimensions of the interlocking elements to be produced, one of the mold parts having formed in its mold parting face a casting channel for the molding material laterally closed by the parting face of the other mold part and extending longitudinally along the row of mold recesses and connected to each of said molds, and a longitudinally adjustable slider movable within said casting channel and bearing against said parting face of said other mold part for the full width of said channel, the cross sectional shape and dimensions of the slider corresponding exactly to those of the channel so that one end face of the slider forms a tight closure of the channel.

4. Apparatus for the manufacture of separable fasteners as defined in claim 1, and comprising a scale carried by said mold box, and index means connected to said longitudinally adjustable closure member to indicate on said scale the free length of said casting channel.

5. Apparatus for the manufacture of separable fasteners having interlocking elements directly molded on the stringers, comprising a two-part mold-box, each mold part being provided on its surface joining the other mold part with a row of spaced recesses, the two rows of recesses coacting with each other when the mold parts are joined to form together molds for producing the fastener elements, each mold part being provided with a shallow recess extending longitudinally along one side of the row of recesses and adapted to receive the stringer on which the elements are to be cast, one of the mold parts having formed in its mold parting face a casting channel laterally closed by the mold parting face of the other mold part extending longitudinally along the opposite side of the rows of recesses, each recess being connected by a groove to said channel, and a longitudinally adjustable slider inserted within said channel and bearing against said parting face of said other mold part for the full width of said channel, said slider having a cross sectional shape and dimensions corresponding exactly to those of the channel, so that the end face of the slider forms a tight closure of said channel.

6. Apparatus for the manufacture of separable fasteners having interlocking elements directly molded on the stringers, comprising a two-part mold-box, said mold-box having therein two parallel spaced recesses for the reception of two stringers, a casting channel for the moulding material extending between said two parallel recesses, and two rows of molds disposed on either side of said casting channel and corresponding to the dimensions of the interlocking elements to be produced, the mold-box being provided with connecting grooves between the molds and the casting channel, the connecting grooves between the channel and the molds of one row of molds being formed in one mold part, and the connecting grooves between the channel and the molds of the other row of molds being formed in the other mold part, the mold-box being formed with an inlet opening communicating with the casting channel for entering casting material thereinto, a closure member in said casting channel having an end portion which exteriorly is of the same cross-sectional shape and dimensions as said channel adapted to be adjusted longitudinally of the channel toward and away from the point of communication of said inlet opening with said channel to vary the free length of the channel.

7. Apparatus for the manufacture of separable fasteners having interlocking elements directly molded on the stringers, comprising a two-part mold-box, said mold-box having therein a recess for the reception of the stringer, a casting channel for the molding material, and a row of molds each connected to said casting channel and corresponding to the dimensions of the interlocking elements to be produced, a longitudinally adjustable slider movable within said casting channel and adapted to serve as closure for plugging said channel adjacent one end thereof, and a transversely movable member disposed at the opposite end of said casting channel and adapted to be moved into either of two positions, said member being provided with a portion closing said opposite end of the channel in one position of the member, and with a channel section disposed in alinement with the casting channel when said member is in the other position.

8. Apparatus for the manufacture of separable fasteners having interlocking elements directly molded on the stringers, comprising a two-part mold-box, each mold part having its surface joining the other part provided with two parallel spaced recesses for the reception of stringers, one of the mold parts being provided with a casting channel extending between said two recesses for the stringers, each mold part comprising a slider transversely movable relatively to said casting channel adjacent to one end of the mold-box and adapted to be brought into either of two positions, each mold part being provided with two rows of mold recesses disposed along either side of said casting channel between said transversely movable sliders and the other end of the mold-box, said mold recesses of the two mold parts cooperating to form molds corresponding to the dimensions of the interlocking elements to be produced, said sliders having cooperating portions forming a tight closure of said casting channel when the sliders are in one of said two positions, and having recesses therein in alinement with said recesses in the mold-parts for the reception of the stringers in either of said two positions, one of said sliders having a channel therein arriving in alinement with said casting channel in one mold part upon transverse displacement of the slider, and both sliders being provided with grooves arriving in alinement with said rows of mold recesses upon such transverse displacement of the sliders.

9. Apparatus for the manufacture of separable fasteners having interlocking elements directly molded on the stringers, comprising a two-part mold-box, said mold-box having therein a recess for the reception of a stringer, a row of molds corresponding to the dimensions of the interlocking elements to be produced, and a casting channel in communication with said molds, and a member having formed therein a mold for producing an end stop member at the end of the row of interlocking elements to be molded on the stringer, said member having said mold being movably mounted on the mold-box for selectively positioning such mold in and out of communication with the casting channel.

10. Apparatus for the manufacture of separable fasteners having interlocking elements directly molded on the stringers, comprising a two-part mold-box, said mold-box having therein two parallel spaced recesses for the reception of stringers to be provided with the interlocking elements, and a casting channel extending between said two parallel recesses, each mold part being provided with two rows of mold recesses formed on either side of said casting channel, the rows of mold recesses of one mold part coacting with the corresponding rows of mold recesses of the other mold part to form molds corresponding to the dimensions of the interlocking elements to be produced, each mold part comprising a member adjacent one end of said rows of mold recesses, which members are movable into either of two positions, said members having formed therein recesses which coact to form molds which severally are in alinement with said rows of recesses at one end thereof and are in communication with said casting channel when said movable members are in one of said positions and are out of such alinement and communication when said members are in the other of said positions, said molds formed by said members corresponding to the shapes and dimensions of end stop members to be produced on the stringers at one of the ends of the rows of interlocking elements thereon.

11. Apparatus for the manufacture of separable fasteners as defined in claim 10, wherein a slider is positioned in the casting channel and is longitudinally movable therein for forming an adjustable end closure for the portion of said channel remote from the movable members, thereby to vary the free length of said channel.

12. Apparatus for the manufacture of separable fasteners having interlocking elements directly molded on the stringers, comprising a two-part mold-box, said mold-box having therein a recess formed between the two parts thereof for the reception of a stringer, a row of molds corresponding to the dimensions of the interlocking elements to be produced, and a casting channel for the molding material, extending longitudinally of said row of molds and connected to each of said molds, the mold-box comprising two sliders transversely movable relatively to said casting channel at one end of said row of molds, said sliders having recesses therein forming a mold corresponding to the dimensions of an end stop member to be produced on the stringer at one end of the row of fastener elements, said sliders being movable to move said molds for the end stop member into or out of alinement with said row of molds for the interlocking elements, and a longitudinally movable slider engaged within said casting channel at the end of the channel opposite said transverse sliders, said longitudinally movable slider forming a stop plug for said casting channel to vary the free length of the channel and the number of molds of said row of molds connected to the casting channel.

13. Apparatus for the manufacture of separable fasteners as defined in claim 12, wherein said mold-box carries a graduated scale cooperating with said longitudinally movable slider engaged within said casting channel to indicate the free length of said channel.

14. Apparatus for the manufacture of separable fasteners as defined in claim 12, wherein said mold-box comprises casting expulsion pins traversing one of said mold parts and adapted to act against the solidified casting between the mold parts to lift the produced interlocking elements out of the molds.

15. A method for the manufacture of separable fasteners having interlocking elements directly molded on the stringers, which includes passing two stringers in spaced relation between the parts of a two-part mold-box presenting two rows of mold recesses, simultaneously casting on each stringer in a single molding operation by use of said recesses a row of interlocking elements, and, at the end of one row, an end stop member serving to limit the movement of the slider at the end remaining open of the finished fastener, and, at the same end of the other row, an end stop member destined to permanently connect the two stringers at the closed end of the finished fastener, removing the stringers from the mold-box, reversing them end for end, and connecting to the last mentioned end stop member the interlocking element opposite it when said stringers are so reversed.

16. A method for the manufacture of separable fasteners having interlocking elements directly molded on the stringers, which includes passing two stringers in spaced relation between the parts of a two-part mold-box presenting two rows of mold recesses, simultaneously casting on each of the stringers by use of said recesses in a single molding operation a series of interlocking elements, and simultaneously therewith casting on one stringer an end stop member for limiting the movement of the slider at the end of the finished fastener remaining open, and on the other stringer, and opposite said end stop member, a second end stop member for permanently uniting the two stringers at the closed end of the finished fastener, advancing the two stringers longitudinally relative to the mold-box to move the end stop members away from said rows of mold recesses and to position, opposite mold recesses which are adjacent those which produce said end stop members, an interlocking element of each row thereof which is adjacent that end of the row which is remote from said end stop members, inserting such so positioned interlocking elements in said mold recesses opposite them, and casting on said stringers continuations of said rows of interlocking elements by use only of mold recesses which are at the sides of the last mentioned recesses opposite the recesses which produce said end stop members.

17. A method for the manufacture of separable fasteners having interlocking elements directly molded on the stringers which includes passing a length of stringer tape between the parts of a two-part mold-box provided with a longitudinally extending series of molds corresponding to the dimensions of the interlocking fastener elements and with a longitudinally extending casting channel connected by identical spaced passages to said molds, supplying casting material to said casting channel to mold a series of interlocking elements on the edge of said length of stringer tape, separating the two mold parts after solidification of the molding material in said molds, channel and connecting passages, and withdrawing such solidified parts and advancing them with the stringer tape until the last molded element of said series of elements is adjacent that end of said series of molds which is opposite the end thereof having the mold for said last molded element, reinserting in the channel the so advanced part molded therein and inserting said last molded element and part molded by its connecting passage in a mold adjacent such opposite end of said series of molds and the connecting passage for that mold, respectively, whereby to introduce a fresh length of stringer tape between said mold parts and cause the reinserted part molded in said channel to serve as a dam for said channel at a point adjacent said opposite end of said series of molds for permitting when said mold parts are again closed the molding of a continuation of said series of elements on the stringer tape.

18. A method for the manufacture of separable fasteners having interlocking elements directly molded on the stringers, which includes passing a length of stringer tape from a supply of tape between the parts of a two-part mold-box provided with a series of molds corresponding to the dimensions of the interlocking elements and with a single mold situated at the beginning of said series in alinement therewith and corresponding to the dimension of an end stop member adapted to limit the movement of the slider in the finished fastener, supplying casting material into said series of molds and said single mold to produce a series of interlocking elements and an end stop member on the edge of said length of stringer tape, advancing said stringer tape after solidification of the molded material until the last molded interlocking element of said series is opposite the first mold of said series of molds whereby a fresh length of tape has been introduced between said mold parts, moving said single mold out of alinement with said series of molds, inserting said last molded element into said first mold, and supplying casting material to said series of molds only to mold a second series of interlocking elements on said tape in correctly spaced relation to said first series of elements.

MARTIN WINTERHALTER.

REFERENCES CITED

The following references are of record in the file of this patent:

UNITED STATES PATENTS

| Number | Name | Date |
| --- | --- | --- |
| 2,341,404 | Winterhalter | Feb. 8, 1944 |
| 2,368,260 | Morin | Jan. 30, 1945 |
| 2,460,102 | Morin | Jan. 25, 1949 |

FOREIGN PATENTS

| Number | Country | Date |
| --- | --- | --- |
| 361,092 | Great Britain | Nov. 19, 1931 |